United States Patent
Shintani et al.

(10) Patent No.: US 10,681,522 B1
(45) Date of Patent: Jun. 9, 2020

(54) EMERGENCY ALERT SETTING CONTROL BASED ON LOCATION CHANGE

(71) Applicant: SONY CORPORATION, Tokyo (JP)

(72) Inventors: Peter Shintani, San Diego, CA (US); Robert Blanchard, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/371,260

(22) Filed: Apr. 1, 2019

(51) Int. Cl.
*H04W 4/90* (2018.01)
*G08B 27/00* (2006.01)
*H04W 4/021* (2018.01)

(52) U.S. Cl.
CPC ............ *H04W 4/90* (2018.02); *G08B 27/008* (2013.01); *H04W 4/021* (2013.01)

(58) Field of Classification Search
CPC ....... H04W 4/029; H04W 4/90; H04W 4/021; H04W 4/023; H04W 76/50; H04W 4/024; H04W 4/02; H04W 88/02; H04W 12/00508; H04W 4/33; H04W 4/025; H04W 4/60; H04W 52/0251; H04W 88/06; H04W 8/245; H04M 1/72572; H04M 1/72533; H04M 1/64; H04M 1/72536; H04M 1/72552; H04M 2201/50; H04M 2203/306; H04M 2242/04; H04M 2242/15; H04M 2242/30; H04M 3/5116; H04M 3/567; H04M 11/007; H04M 2250/10; H04L 67/18; H04L 65/1069; H04L 65/1096; H04L 65/403; H04L 67/26; H04L 12/2818; H04L 67/12; H04L 67/306; G08B 25/016; G08B 27/001; G08B 25/001; G08B 25/08; G08B 7/066; G08B 21/02; G08B 25/009; G08B 13/00; G08B 21/10; G08B 25/005; G08B 25/10; G08B 27/00; G08B 27/006; G08B 13/19682; G08B 21/0211;
(Continued)

(56) References Cited

U.S. PATENT DOCUMENTS

2007/0004334 A1\* 1/2007 Tsuchiyama ......... H04B 1/3805
  455/9
2009/0143067 A1\* 6/2009 Kim ........................ H04N 5/44
  455/434
(Continued)

*Primary Examiner* — Nimesh Patel
(74) *Attorney, Agent, or Firm* — Chip Law Group

(57) ABSTRACT

An electronic apparatus for emergency alert setting control based on a location change, is provided. The electronic apparatus stores emergency alert setting and location information associated with a known location of the electronic apparatus. The electronic apparatus detects a change in the known location of the electronic apparatus from the known location to a different location. The electronic apparatus outputs notification information to update the stored emergency alert setting based on the detected change in the known location of the electronic apparatus. The electronic apparatus receives a first user input corresponding to at least one emergency setting parameter of the stored emergency alert setting based on the output notification information. The electronic apparatus updates the emergency alert setting based on the received user input and receives new emergency information, included in multimedia content, from a different broadcast station via a different broadcast channel based on the updated emergency alert setting.

20 Claims, 7 Drawing Sheets

(58) Field of Classification Search
CPC ...... G08B 25/00; G08B 25/006; G08B 25/14; G08B 27/003; G08B 27/008
See application file for complete search history.

(56) References Cited

U.S. PATENT DOCUMENTS

| | | | |
|---|---|---|---|
| 2009/0197566 A1* | 8/2009 | Ito | G08B 21/10 455/404.1 |
| 2010/0004026 A1* | 1/2010 | Lee | H04H 40/00 455/566 |
| 2010/0211972 A1* | 8/2010 | Howarter | G08B 27/008 725/33 |
| 2010/0229205 A1* | 9/2010 | Hakusui | H04H 20/72 725/62 |
| 2010/0315227 A1* | 12/2010 | Emerson | G08B 25/016 340/540 |
| 2013/0212621 A1* | 8/2013 | Corl | H04N 21/6112 725/33 |
| 2013/0281047 A1* | 10/2013 | Daly | H04W 4/90 455/404.1 |
| 2014/0050137 A1* | 2/2014 | Alberth, Jr. | H04W 4/06 370/312 |
| 2019/0129420 A1* | 5/2019 | Yoshizaki | G05D 1/0088 |

* cited by examiner

US 10,681,522 B1

EMERGENCY ALERT SETTING CONTROL BASED ON LOCATION CHANGE

CROSS-REFERENCE TO RELATED APPLICATIONS/INCORPORATION BY REFERENCE

None.

FIELD

Various embodiments of the disclosure relate to interactive consumer electronics (CE) technology. More specifically, various embodiments of the disclosure relate to an emergency alert setting control based on a location change.

BACKGROUND

Advancements in interactive consumer electronics (CE) technology have led to development of various technologies for dissemination of emergency alerts on different consumer electronic devices (for example, televisions), in case of a public emergency situation, for example, a natural disaster. In some countries, emergency alerts are employed to disseminate a fixed length message. For example, in the United States of America (USA), Wireless Emergency Alert (WEA) is a common emergency procedure that is used to disseminate emergency alerts to the general public and users of mobile devices within a given region using mobile carriers and existing telecom resources. Typically, in case of a public emergency situation (such as a storm or a flooding), mobile carriers and associated established telecom resources suffer significant outage due to several reasons. Some of these reasons include a vulnerability in position and height of established telecom resources in different regions, power outages or failures, and over utilization of mobile carriers that leads to unavoidable congestions in traffic. All these reasons lead to either a delay or a loss of communication and/or dissemination of the emergency alerts in public emergency situations. In lieu of this, Advanced Television Systems Committee (ATSC) has recommended provisions for dissemination of emergency alerts using broadcast channels (such as television broadcast channels) for individual regions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for emergency alert setting control based on a location change is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for emergency alert setting control based on a location change. Exemplary aspects of the disclosure provide an electronic apparatus that may be configured to store emergency alert setting and location information associated with a known location of the electronic apparatus. The emergency alert setting may be associated with emergency information in multimedia content that may be received from a broadcast station. The emergency information may be associated with critical information of an area of a location where the electronic apparatus may be present. Examples of the emergency information may include, but are not limited to, a natural disaster warning (for example, tsunami alert in coastal areas), a health related warning (e.g., cholera spread warning), a fire situation, a terror attack, a gun fight, or a property related warning (e.g., building collapsed in an area).

The disclosed electronic apparatus facilitates delivery of notification information as an alert to a user to update emergency alert setting of the electronic apparatus when a change in the known location of the electronic apparatus is detected. The electronic apparatus may include a display screen or one or more speakers to output the notification information to the user. The electronic apparatus may be further configured to receive an input from the user in response to the notification information. The disclosed electronic apparatus may be further configured to update the emergency alert setting based on the received input. The disclosed electronic apparatus may be further configured to receive the multimedia content that may include the emergency information associated with the new location, based on the updated emergency alert setting. The disclosed electronic apparatus may be configured to provide a user interface that provides the user with the capability to update emergency alert setting of the electronic apparatus based on the detection of change in the known location of the electronic apparatus.

The disclosed electronic apparatus may execute various operations to detect the change in the known location of the electronic apparatus. Thus, an intelligent and advanced electronic apparatus may be provided which may detect the change in the known location of the electronic apparatus and output an alert that may prompt the user to update the emergency alert setting. This prompt may also help the user to update the emergency alert settings when the user shifts or relocates the electronic apparatus to a new location and may have forgotten to update the update the emergency alert settings. The disclosed electronic apparatus may help to efficiently disseminate relevant emergency information to the electronic apparatus that matches user preferences and is relevant to the new location of the electronic apparatus based on the updated emergency alert setting.

Figure 1:
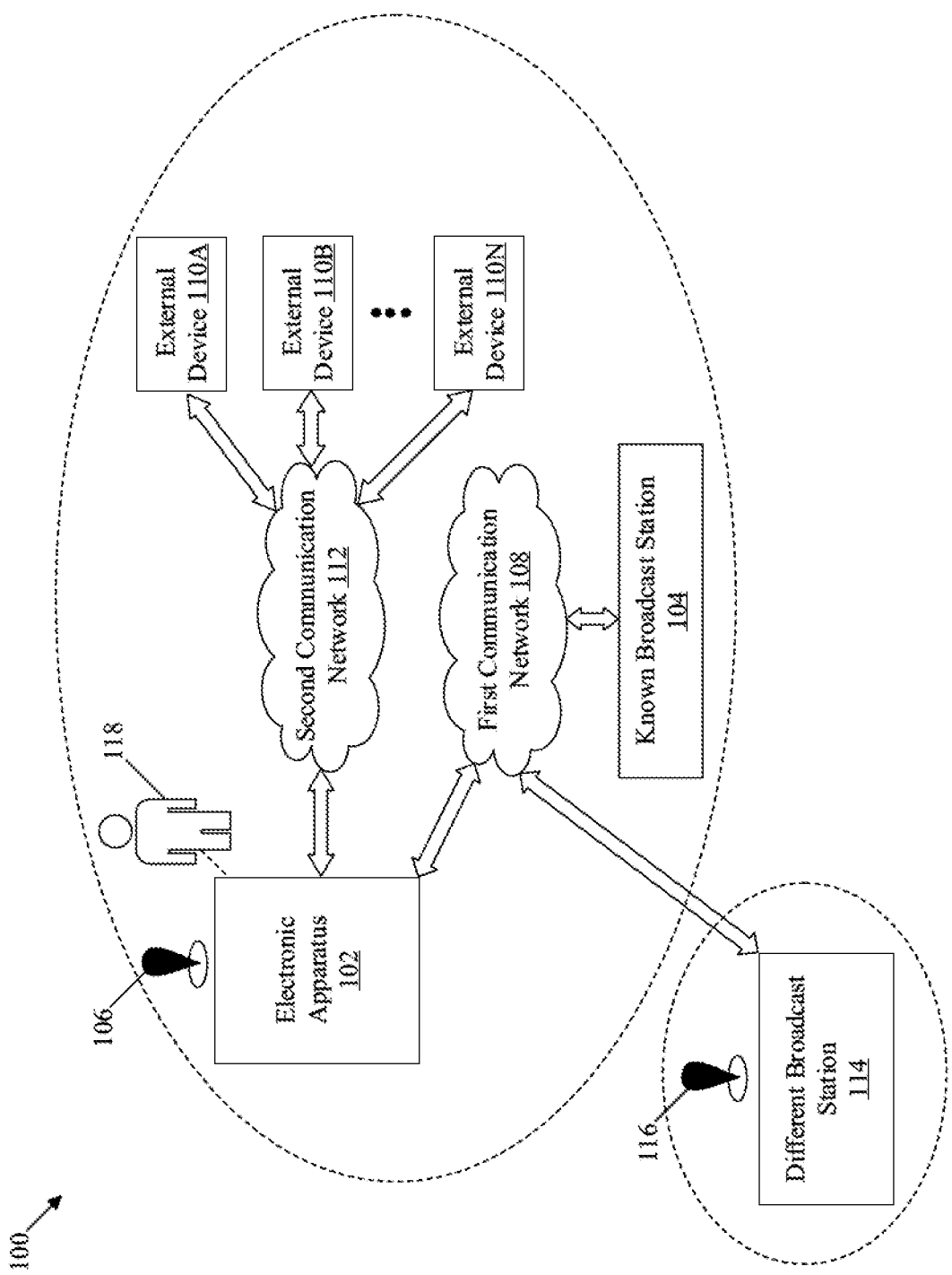
FIG. 1 is a block diagram that illustrates an exemplary network environment for emergency alert setting control based on a location change, in accordance with an embodiment of the disclosure.

FIG. 1 is a block diagram that illustrates an exemplary network environment for emergency alert setting control based on a location change, in accordance with an embodiment of the disclosure. With reference to FIG. 1, there is shown a network environment 100. The network environment 100 may include an electronic apparatus 102 and a known broadcast station 104 at a known location 106 of the electronic apparatus 102. The known location 106 of the electronic apparatus 102 may correspond to a location for which an emergency alert setting may be pre-specified on the electronic apparatus 102. There is further shown a first communication network 108 that may exist between the electronic apparatus 102 and the known broadcast station 104. In some embodiments, the electronic apparatus 102 may be paired with a plurality of external devices 110A, 110B . . . and 110N, via a second communication network 112. The network environment 100 may further include a different broadcast station 114 that may be associated with a different location 116 from the known location 106. There is further shown a user 118 who is associated with the electronic apparatus 102.

The electronic apparatus 102 may comprise suitable logic, circuitry and interfaces that may be configured to receive multimedia content from a broadcast station, such as the known broadcast station 104 or the different broadcast station 114. The received multimedia content may include emergency information associated with the known location 106 of the electronic apparatus 102. Alternatively, the multimedia content may include new emergency information that may be associated with the different location 116 of the electronic apparatus 102 in case there is a change in the known location 106 of the electronic apparatus 102. The electronic apparatus 102 may be configured to maintain updated records of location information that may be indicative of a location, such as the known location 106 or the different location 116, of the electronic apparatus 102. In accordance with an embodiment, the electronic apparatus 102 may be configured to prompt the user 118 to enter a different emergency alert setting for the electronic apparatus 102 in accordance with a detection of a change of the known location 106 of the electronic apparatus 102. Examples of the electronic apparatus 102 may include, but are not limited to, a television (TV) system, a TV tuner, a set-top-box, a smart TV, a display system, a computing device, a gaming device, a mobile phone, a server, a computer work-station, and/or a smart appliance.

The known broadcast station 104 may comprise suitable logic, circuitry, and/or interfaces that may be configured to broadcast multimedia content that includes the emergency information to the electronic apparatus 102. The emergency information may correspond to the known location 106 of the electronic apparatus 102. The known broadcast station 104 may be configured to broadcast the multimedia content via a known broadcast channel of a plurality of known broadcast channels to the electronic apparatus 102. The known broadcast channel may correspond to a known broadcast frequency associated with a specific broadcast network.

As an example, the known broadcast frequency may be one of the frequencies of a Very High Frequency (VHF) or an Ultra High Frequency (UHF) band that is reserved for multimedia transmission. An example of the known broadcast station 104 may be a terrestrial television broadcast station that may include radio frequency (RF) circuitries and data processing circuitries for broadcast of multimedia content across a specific region. The known broadcast station 104 may be implemented by use of several technologies that may be well known to those skilled ordinarily in the art. Thus, details of the known broadcast station 104 is omitted from the disclosure for the sake of brevity.

The first communication network 108 may include a communication medium through which the electronic apparatus 102 at the known location 106 may be communicatively coupled to the known broadcast station 104. Also, in case the electronic apparatus 102 is at the different location 116, the first communication network 108 may be between the different broadcast station 114 and the electronic apparatus 102. In an exemplary embodiment, the first communication network 108 may be a terrestrial television network that may correspond to a broadcast network for multimedia content disseminated via one or more broadcast channels. Alternatively, in some cases, the first communication network 108 may be a wireless local area network (WLAN), the Internet, a cloud network, or a Metropolitan Area Network (MAN), and the like.

Each of the plurality of external devices 110A, 110B . . . and 110N may comprise suitable logic, circuitry and interfaces that may be configured to communicate with the electronic apparatus 102, via the second communication network 112. In accordance with an embodiment, each of the plurality of external devices 110A, 110B . . . and 110N may be configured to receive the multimedia content that includes the emergency information (or the new emergency information) from the electronic apparatus 102, via the second communication network 112. The plurality of external devices 110A, 110B . . . and 110N may be further configured to render the received multimedia content. In some embodiments, each of the plurality of external devices 110A, 110B . . . and 110N may be further configured to update the emergency alert setting of the electronic apparatus 102 based on a first user input in response to a prompt to update the emergency alert setting for the different location 116 of the electronic apparatus 102. Examples of the plurality of external devices 110A, 110B . . . and 110N may include, but are not limited to, a display system, a smart TV remote, a computing device, a gaming device, a mobile phone, a or an electronic device with capability to store or render the multimedia content.

The second communication network 112 may include a communication medium through which the electronic apparatus 102 may be communicatively coupled to the plurality of external devices 110A, 110B . . . and 110N. Examples of the second communication network 112 may include, but are not limited to, a home network, a Wireless Fidelity (Wi-Fi) network, a Personal Area Network (PAN), or a Local Area Network (LAN). Various devices in the network environment 100 may be configured to connect to the second communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, and Bluetooth (BT) communication protocols.

The different broadcast station 114 may comprise suitable logic, circuitry, and/or interfaces that may be configured to broadcast the multimedia content that includes the new emergency information to the electronic apparatus 102. The new emergency information may correspond to the different location 116 of the electronic apparatus 102. The different broadcast station 114 may be configured to broadcast the multimedia content via a different broadcast channel of a plurality of different broadcast channels to the electronic apparatus 102. The different broadcast channel may correspond to same or a different broadcast frequency associated with same or different broadcast network. As an example, the broadcast frequency may be one of the frequencies of a VHF or a UHF band that is reserved for multimedia transmission. An example of the different broadcast station 114 may be a terrestrial television broadcast station that may include radio frequency (RF) circuitries and data processing circuitries for broadcast of multimedia content across a specific region. The different broadcast station 114 may be implemented by use of several technologies that may be well known to those skilled ordinarily in the art. Thus, details of the different broadcast station 114 is omitted from the disclosure for the sake of brevity.

In operation, the electronic apparatus 102 may be configured to store the emergency alert setting of the electronic apparatus 102 and location information associated with the known location 106 of the electronic apparatus 102. The known location 106 may correspond to a location of the electronic apparatus 102 for which the emergency alert setting is pre-set on the electronic apparatus 102. The emergency alert setting may be stored at a time of first-time setup of the electronic apparatus 102. The electronic apparatus 102 may be configured to receive the multimedia content from the known broadcast station 104, via the first communication network 108. The multimedia content may include the emergency information based on the stored emergency alert setting and the location information of the known location 106 of the electronic apparatus 102.

The known broadcast station 104 may be associated with the known location 106 of the electronic apparatus 102. The electronic apparatus 102 may be configured to receive the multimedia content from the known broadcast station 104 via a known broadcast channel from a plurality of known broadcast channels associated with the known broadcast station 104. In an event where the electronic apparatus 102 is moved from one location to another location, such as from the known location 106 to the different location 116, there may be a need to update the emergency alert setting for the new location, such as the different location 116. Typically, different emergency situations may arise due to one or more of weather conditions, demographic factors, geological factors, climate, temperature-related factors, and the like. For example, a coastal location may be much more prone to emergency situations like tsunami, landslides, river flooding, mudslides, coastal flooding, storm surges, and hurricanes. Whereas a cold and hilly location may be more prone to snow avalanches, landslides, extreme snowfall, snow storms, and the like. The emergency information for both of the locations may be different based on possibilities of different emergency situations in both of the respective locations. In case the electronic apparatus 102 is moved from the coastal location to the cold and hilly location, the emergency alert setting may need to be updated in order to disseminate correct emergency alerts that match the emergency situations of the cold and hilly location.

The electronic apparatus 102 may be configured to detect a change in the known location 106 of the electronic apparatus 102 from the known location 106 to a different location, such as the different location 116. The electronic apparatus 102 may be further configured to output notification information as an alert to update the emergency alert setting of the electronic apparatus 102, based on the detected change in the known location 106 of the electronic apparatus 102. For example, the notification information may include a message prompt for the user 118 to provide the first user input to update at least one emergency parameter of the stored emergency alert setting. The detection of the change in the known location 106 of the electronic apparatus 102 is described in detail, for example, in FIGS. 4 and 6. The electronic apparatus 102 may be further configured to receive a first user input corresponding to the at least one emergency setting parameter of the stored emergency alert setting, in response to the output of the notification information. The stored emergency alert setting may include a plurality of emergency settings parameters that may include the at least one emergency setting parameter corresponding to the user input. The plurality of emergency setting parameters may include, but are not limited to, a type of the emergency information to be received, a degree of severity of the emergency information, and a mode to render the emergency information. The mode to render the emergency information may be one or more of an audio mode, a video mode, or an audio-video (AV) mode.

The electronic apparatus 102 may be further configured to update the emergency alert setting of the electronic apparatus 102 based on the received first user input. The setup of the emergency alert setting of the electronic apparatus 102 is described in detail, for example, in FIGS. 3, 4, 5, and 6. In accordance with an embodiment, the electronic apparatus 102 may be further configured to store the updated emergency alert setting in memory (not shown) of the electronic apparatus 102.

The electronic apparatus 102 may be further configured to receive new emergency information in the multimedia content from the different broadcast station 114 associated with the different location 116. The electronic apparatus 102 may be configured to receive the multimedia content from the different broadcast station 114, via the first communication network 108, based on the updated emergency alert setting. The electronic apparatus 102 may be configured to receive the multimedia content via a different broadcast channel from a plurality of broadcast channels associated with the different broadcast station 114.

In some embodiments, the electronic apparatus 102 may be configured to transmit the notification information to the at least one external device of the plurality of external devices 110A, 110B . . . and 110N. In such cases, the electronic apparatus 102 may be configured to receive the first user input corresponding to the at least one emergency setting parameter of the stored emergency alert setting on the electronic apparatus 102. The electronic apparatus 102 may be further configured to update the emergency alert setting based on the received user input and transfer the updated emergency alert setting to at least one external device of the plurality of external devices 110A, 110B . . . and 110N, via the second communication network 112.

The disclosed electronic apparatus 102 may facilitate the user 118 to update the emergency alert setting of the electronic apparatus 102 based on detection of the change in the known location 106 of the electronic apparatus 102. This may further improve new device experience of the user 118 for update operation of the emergency alert setting of the electronic apparatus 102, in case the user 118 changes the known location 106 of the electronic apparatus 102.

Figure 2:
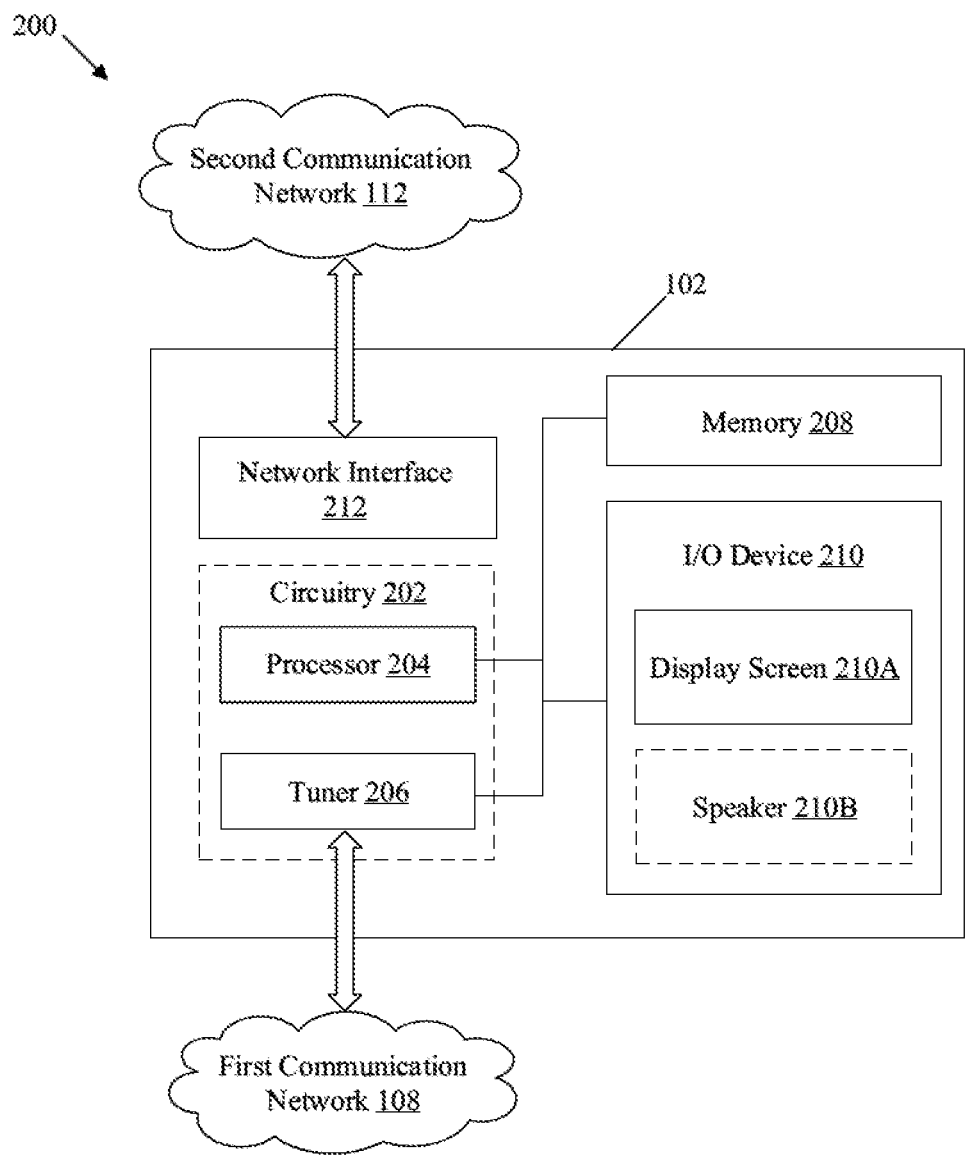
FIG. 2 is a block diagram that illustrates an exemplary electronic apparatus for emergency alert setting control based on a location change, in accordance with an embodiment of the disclosure.

FIG. 2 is a block diagram that illustrates an exemplary electronic apparatus for emergency alert setting control based on a location change, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202 that may include a processor 204 and a tuner 206. The electronic apparatus 102 may further include a memory 208, an input/output (I/O) device 210, and a network interface 212. The I/O device 210 may include a display screen 210A and a speaker 210B. The circuitry 202 may be communicatively coupled to the memory 208 and the I/O device 210. In some embodiments, the circuitry 202 may be also configured to communicate with either of the known broadcast station 104, the different broadcast station 114 at the different location 116, or a content delivery server (such as an ad server), through the network interface 212.

The processor 204 may comprise suitable logic, circuitry, and/or interfaces that may be configured to execute instructions stored in the memory 208. The processor 204 may be configured to receive multimedia content from one of the known broadcast station 104 or the different broadcast station 114 at the different location 116, via the first communication network 108 based on a current location of the electronic apparatus 102. The processor 204 may be further configured to receive one or more user inputs via the display screen 210A. In accordance with an embodiment, the processor 204 may be configured to communicate with the plurality of external devices 110A, 110B . . . and 110N through the network interface 212. The processor 204 may be further configured to update the emergency alert setting of the electronic apparatus 102 based on the received one or more user inputs. The processor 204 may be further configured to receive new emergency information included in the multimedia content from the different broadcast station 114 based on the updated emergency alert setting. In accordance with an embodiment, the processor 204 may be configured to update the emergency alert setting and control the reception of the new emergency information associated with the different location 116 of the electronic apparatus 102 after a change in the known location 106 (i.e. an initial location) of the electronic apparatus 102.

The processor 204 may be implemented based on a number of processor technologies known in the art. Examples of implementations of the processor 204 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The tuner 206 may comprise suitable logic, circuitry, and/or interfaces that may be configured to receive a multimedia stream via a broadcasted RF signal. The multimedia stream may be received from either from the known location 106 of the known broadcast station 104 or from the different location 116 of the different broadcast station 114 based on a current location of the electronic apparatus 102 at the time of reception of the multimedia stream. The tuner 206 may be further configured to execute at least one of selective tuning, demodulation, transport stream de-multiplexing, decompression of encoded multimedia content, error correction, analog-to-digital conversion, AV synchronization and media reformatting operation. This may be executed to prepare multimedia content from a specific broadcast channel in the received multimedia stream to be displayed onto the display screen 210A of the electronic apparatus 102, in compliance with the display specification and settings for the display screen 210A. In accordance with an embodiment, a signal quality of the multimedia content may be determined based on an error detection of the multimedia content. An example of the tuner 206 may be an (Advanced Television Systems Committee) ATSC-compliant tuner.

The tuner 206 may include different components for selective tuning, demodulation, transport stream de-multiplexing, decompression of encoded multimedia content, error correction, analog-to-digital conversion, AV synchronization and media reformatting operation. As an example, the tuner 206 may include an adaptive gain controller (AGC) that may be configured to set a specific gain for broadcasted RF signals. As another example, the tuner 206 may include a ghost canceller that may be configured to suppress a ghost effect on the RF broadcast signals from either of the known broadcast station 104 or the different broadcast station 114. The ghost effect may correspond to a condition in which a replica of a transmitted image may offset in position and appears to be super-imposed on top of a main image of the multimedia content. This may be caused when RF broadcast signals travels by two or more different paths to a receiver antenna for the electronic apparatus 102, with a minor difference in arrival timings to the receiver antenna. The different components of the tuner 206 may be known to one ordinarily skilled in the art and thus, details of the different components of the tuner 206 are omitted from the disclosure for the sake of brevity.

The memory 208 may comprise suitable logic, circuitry, and/or interfaces that may be configured to store instructions executable by the processor 204. In accordance with an embodiment, the memory 208 may be further configured to store, for example, settings (i.e. the emergency alert setting) of the electronic apparatus 102 and location information of the electronic apparatus 102. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, and/or interfaces that may be configured to act as an I/O channel/interface between the user 118 and the different operational components of the electronic apparatus 102. The I/O device 210 may be configured to receive one or more user inputs from the user 118 and relay the received one or more user inputs to the processor 204, via dedicated buses. The I/O device 210 may be configured to receive an output (i.e. the notification information) from the processor 204 and provide the received output to the user 118. The I/O device 2106 may include various input and output devices, which may be configured to communicate with different operational components of the electronic apparatus 102. Examples of the I/O device 210 may include, but are not limited to, a touch screen, a keyboard, a mouse, a joystick, a microphone, a display screen (for example the display screen 210A), a speaker (for example the speaker 210B), and an image capturing device.

The display screen 210A may comprise suitable logic, circuitry, and/or interfaces that may be configured to render the multimedia content including the emergency information, the emergency alert setting, and the notification information for the user 118. In accordance with an embodiment, the display screen 210A may be a touch screen to receive the one or more user inputs from the user 118. The touch screen may be at least one of, but is not limited to, a resistive touch screen, a surface acoustic wave touch screen, or a capacitive touch screen. The display screen 210A may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 210A may refer to a display screen of a smart-glass device, a see-through display, a projection-based display, an electro-chromic display, or a transparent display. In accordance with an embodiment, the display screen 210A may be an external display screen that may be connected to the electronic apparatus 102.

The speaker 210B may comprise suitable logic, circuitry, and/or interfaces that may be configured to generate an audio output corresponding to an output (i.e. notification information) associated with the emergency alert setting of the electronic apparatus 102. The speaker 210B may be configured to play audio content from the multimedia content received from one of the known broadcast station 104 or the different broadcast station 114. Examples of the speaker 2108 may include, but are not limited to, a loudspeaker, a full-range speaker, a mid-range speaker, a woofer, a subwoofer, a coaxial speaker, a monitor speaker, a smart speaker, a N.1 speaker system (where N is the number of full bandwidth channels), and a tweeter.

The network interface 212 may comprise suitable logic, circuitry, and/or interfaces that may be configured to establish a communication between the electronic apparatus 102 and the plurality of external devices 110A, 110B . . . and 110N, via the second communication network 112. The network interface 212 may be implemented by use of various known technologies to support wired or wireless communication of the electronic apparatus 102 with the second communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer. The functions or operations executed by the electronic apparatus 102, as described in FIG. 1, may be executed by the circuitry 202 are further described, for example, in the FIGS. 3, 4, 5, and 6.

Figure 3:
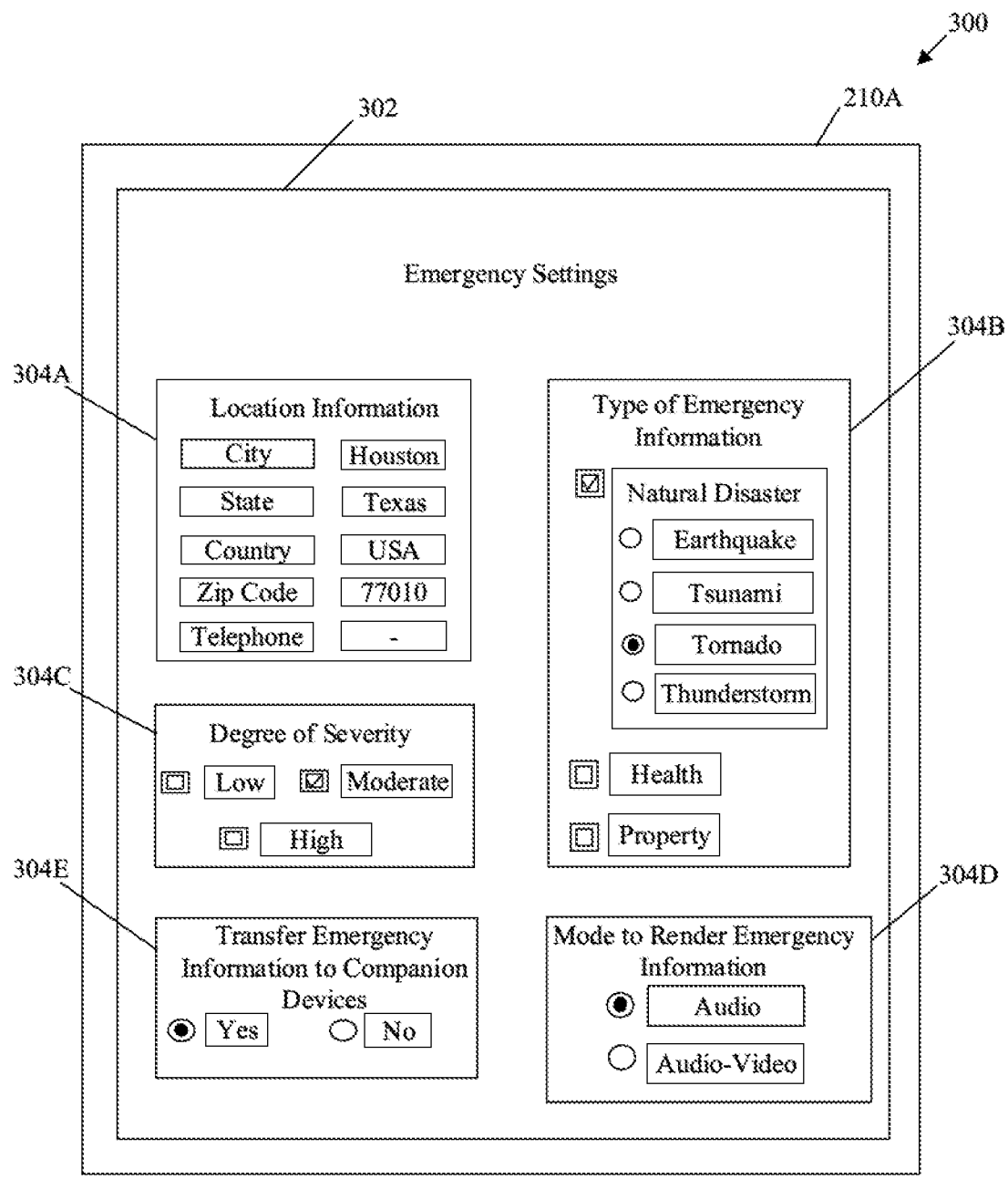
FIG. 3 illustrates an exemplary user interface for the emergency alert setting for the electronic apparatus 102 of FIG. 2, in accordance with an embodiment of the disclosure.

FIG. 3 illustrates an exemplary user interface for the emergency alert setting for the electronic apparatus 102 of FIG. 2, in accordance with an embodiment of the disclosure. FIG. 3 is explained in conjunction with elements from FIGS. 1 and 2. With reference to the FIG. 3, there is shown a display portion 302 displayed on the display screen 210A for the emergency alert setting of the electronic apparatus 102. The display portion 302 may include a plurality of user interface (UI) elements 304A, 304B, 304C, 304D, and 304E corresponding to the emergency alert setting. The plurality of UI elements 304A, 304B, 304C, 304D, and 304E may correspond to a plurality of emergency setting parameters. The plurality of emergency setting parameters may include, but are not limited to, location information of the electronic apparatus 102, a type of emergency information to be received, a degree of severity of the emergency information, a mode to render the emergency information, or a choice of transfer of emergency information to companion devices (such as the plurality of external devices 110A, 110B, . . . and 110N).

For example, the plurality of UI elements 304A, 304B, 304C, 304D, and 304E may indicate a current emergency alert setting (such as, "Tornado" as a default type of emergency information) with the first-time setup of the electronic apparatus 102. The detailed information for the plurality of UI elements 304A, 304B, 304C, 304D, and 304E may include a plurality of UI options corresponding to each of the plurality of UI elements 304A, 304B, 304C, 304D, and 304E. The plurality of UI options may further include a plurality of input fields to receive the one or more user inputs corresponding to the emergency setting parameters. Examples of the input fields of UI options may include, but are not limited to, checkboxes, radio buttons, text boxes, click buttons, and drop downs.

The type of emergency information to be received may include a type of the emergency information for which the user 118 may have an interest or may perceive best suited for that particular location. The type of emergency information may be associated with an emergency likelihood for a specific location of the electronic apparatus 102, for example, tsunami alerts in coastal areas. The emergency likelihood may depend on historical type of emergency situations witnessed in a location and future forecast of emergency situations for the location. The degree of severity of the emergency information may be associated with an intensity or criticality of the emergency information for the user 118 in light of safety of the user 118 and associated resources of the user 118.

As an example, the user 118 may only want to receive the emergency information if the emergency information is of high criticality. The emergency alert setting may include an option for the user 118 to choose whether to share the received emergency information with its companion devices (such as the plurality of external devices 110A, 110B . . . and 110N), via a selection of the UI element 304E. The emergency alert setting may also include an option for the user 118 to choose whether to render the received emergency information via an audio mode or an audio-video (AV) mode using the UI element 304D.

As another example, the processor 204 may be configured to receive the location information, the type of emergency information, the degree of severity, the mode to render emergency information, and the choice of transfer of emergency information to companion devices, via the UI element 304A, the UI element 304B, the UI element 304C, the UI element 304D, and the UI element 304E, respectively. The location information may include details as follows: City: "Houston", State: "Texas", Country: "USA", and Zip Code: "77010". Similarly, the type of emergency information may include "Tornado" as an input, the degree of severity may be set as "Moderate", and mode to render emergency information may be "Audio". Also, the user 118 may set "Yes" as the choice to transfer emergency information to companion devices.

In accordance with an embodiment, the processor 204 may be configured to control the display screen 210A to output the notification information displayed in the display portion 302, based on the detection of the change in the known location 106 of the electronic apparatus 102 from the known location 106 to the different location 116. In some embodiments, the processor 204 may be further configured to control the speaker 2108 to output the notification information to the user 118. The detection of the change in the known location 106 of the electronic apparatus 102 may be described further in detail, for example, in FIG. 4.

In accordance with an embodiment, the processor 204 may be configured to receive a first user input (such as a touch-based user input) via the plurality of UI elements 304A, 304B, 304C, 304D, and 304E from the user 118 to select a preferred emergency alert setting of the electronic apparatus 102 and to update the emergency alert setting of the electronic apparatus 102. The processor 204 may be further configured to store the updated emergency alert setting in the memory 208. Accordingly, the electronic apparatus 102 may be configured to receive the multimedia content including the new emergency information from the different broadcast station 114 based on the updated emergency alert setting.

Figure 4:
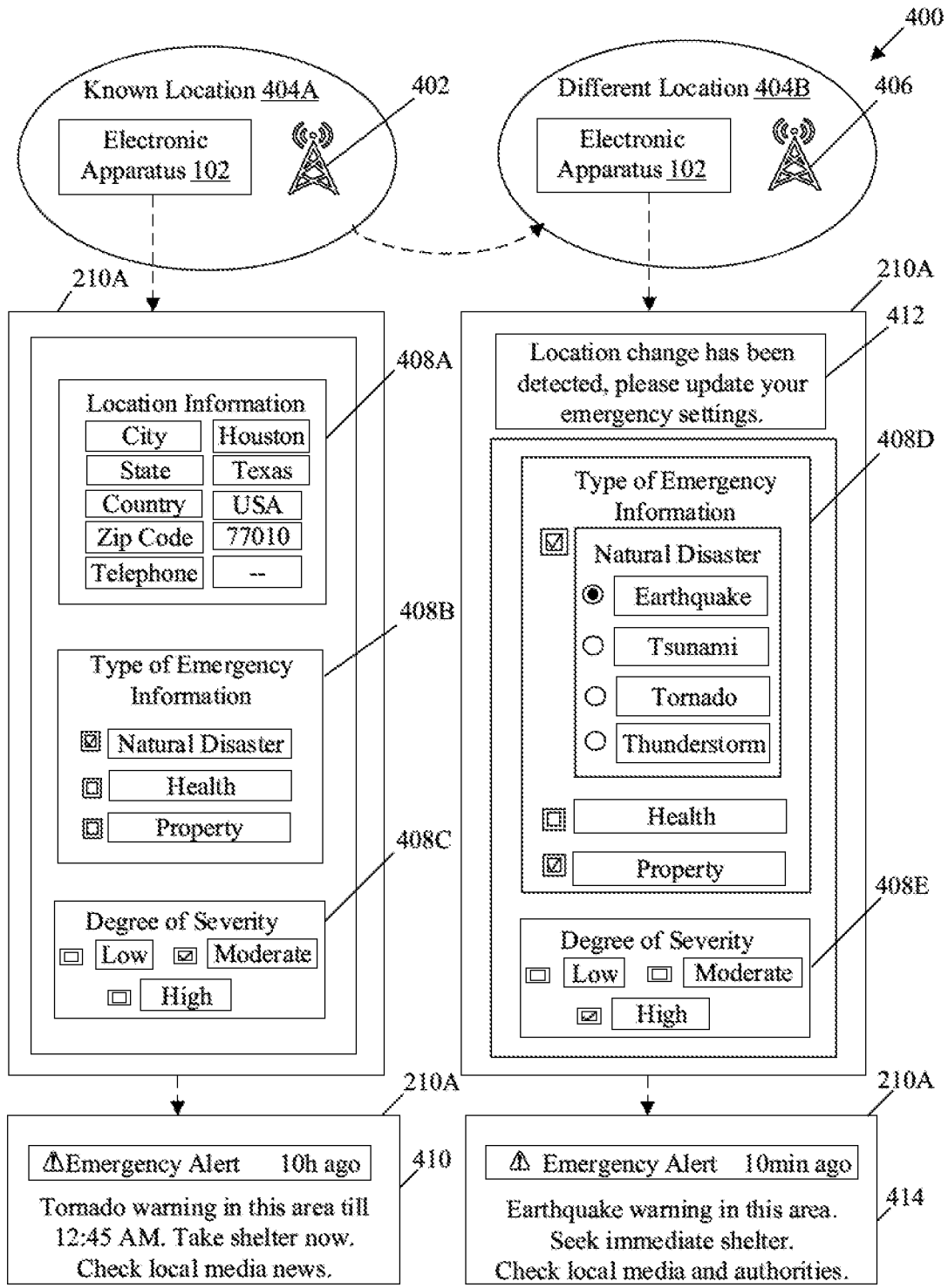
FIG. 4 illustrates an exemplary scenario for emergency alert setting control based on a location change of the electronic apparatus of FIG. 2, in accordance with an embodiment of the disclosure.

FIG. 4 illustrates an exemplary scenario for emergency alert setting control based on a location change of the electronic apparatus of FIG. 2, in accordance with an embodiment of the disclosure. FIG. 4 is explained in conjunction with elements from FIGS. 1, 2, and 3. With reference to FIG. 4, there is shown an exemplary scenario 400.

In the exemplary scenario 400, there is shown the electronic apparatus 102, a known broadcast station 402 for a known location 404A and a different broadcast station 406 for a different location 404B. The known broadcast station 402 and the different broadcast station 406 may correspond to the known broadcast station 104 and the different broadcast station 114, respectively. There is further shown the display screen 210A of the electronic apparatus 102 at the known location 404A. The display screen 210A may be configured to display a plurality of UI elements 408A, 408B, and 408C corresponding to the emergency alert setting of the electronic apparatus 102 with respect to the known location 404A. There is further shown a display portion 410 on the display screen 210A of the electronic apparatus 102 for display of emergency information with respect to the known location 404A. There is further shown the display screen 210A of the electronic apparatus 102 at the different location 404B. The display screen 210A may be configured to display a display portion 412 and UI elements 408D and 408E with respect to the different location 404B. The display portion 412 may display the notification information to the user 118. There is further shown a display portion 414 on the display screen 210A for display of the new emergency information with respect to the different location 404B.

Initially, the electronic apparatus 102 may be present at the known location 404A in a coverage area of the known broadcast station 402. The known location 404A may correspond to a location for which the emergency alert setting is pre-specified on the electronic apparatus 102. After a specific period, the electronic apparatus 102 may be moved by the user 118 to the different location 404B. The different location 404B may be within the coverage area of the different broadcast station 406. In such a case, there may be a wireless broadcast network that may facilitate the electronic apparatus 102 to receive a multimedia stream of multimedia content from the different broadcast station 406. The movement of the electronic apparatus 102 may correspond to a relocation of the electronic apparatus 102 from the known location 404A to the different location 404B. In many cases, the relocation of the electronic apparatus 102 to the different location 404B may result in change of emergency situations that are known to arise in a region corresponding to the different location 404B.

Typically, the emergency alert setting for the known location 404A may still be initially setup on the electronic apparatus 102 while the electronic apparatus 102 is at the different location 404B. This may also cause erroneous display of the emergency information for the previous location, i.e. the known location 404A, which may not be helpful or desirable. As the user 118 may forget to update the emergency alert setting at the different location 404B, there is a need to notify the user 118 to update the emergency alert setting based on automatic detection of the change in the known location 404A of the electronic apparatus 102 from the known location 404A to the different location 404B.

The processor 204 may be configured to determine that the stored location information is associated with the known location 404A. The tuner 206 may be configured to receive, from the known broadcast station 402, the multimedia content via the known broadcast channel based on the determination that the stored location information is associated with the known location 404A. The multimedia content may include emergency information that is different from the new emergency information associated with the different location 404B. The multimedia content may be initially encoded and modulated on a carrier signal at the known broadcast station 402 in order to transmit the multimedia content to the electronic apparatus 102. The multimedia content may include a plurality of signaling bits that may include information associated with at least one of sampling rate, signal bandwidth, subcarrier spacing, time domain structure, and the like. The tuner 206 may be configured to demodulate an RF broadcast signal that includes the multimedia content based on the plurality of signaling bits. The tuner 206 may be further configured to extract the multimedia content using conventional digital baseband processing and RF processing techniques that may be known in the art.

In some exemplary scenario, the known location 404A of the electronic apparatus 102 may change from the known location 404A to the different location 404B as the electronic apparatus 102 is relocated to the different location 404B. The electronic apparatus 102 at the different location 404B may be within the coverage area of the different broadcast station 406. The RF broadcast signals that carries the multimedia content may then have to travel through a different path to reach the electronic apparatus 102 at the different location 404BA, as compared to an initial path for the known location 404A of the electronic apparatus 102. The different path may be associated with one of or a combination thereof a different attenuation, a multipath reflection, or a shortened or an extended path length.

In some cases, the multipath reflection may lead to reception of multiple RF broadcast signals of the same multimedia content at slightly different times. This may result in an appearance of a ghosting effect. The tuner 206 may be configured to execute ghost cancellation of RF broadcast signals that carry the multimedia content using a ghost cancelling reference (GCR) signal that may be transmitted by the different broadcast station 406 with the multimedia content. The GCR signal may be a special sub-signal that the tuner 206 may utilize to suppress the ghosting effect. Further, the tuner 206 may be configured to generate a local GCR signal that may be a replica of the received GCR signal to eliminate the ghosting effect. The suppression or elimination of the ghosting effect may help to precisely measure changes, including minute and large changes, in different signal parameters, such as a signal quality of the received RF broadcast signal (analog) or a baseband digital signal that includes a bit-stream of the multimedia content. The precise measurement of the changes in the different signal parameters may help to detect from major changes and even minor changes in the known location 404A of the electronic apparatus 102.

One of the relevant signal parameters for the detection of the change in the known location 404A of the electronic apparatus 102 is signal quality. The signal quality may be measured in terms of signal strength (in dB-millivolts per meter (dBmV/m)) for the analog broadcast RF signal that carries the multimedia content. Alternatively, the signal quality may be measured from the baseband digital signal that includes the bit-stream of the multimedia content from estimation of bit-error rates (BER). It may be assumed that at a given location, the electronic apparatus 102 may be in an environment that may have almost same topography, obstructing structures, and environmental conditions within a given time period. Thus, the signal quality (i.e. BER or attenuation/effective path loss) may lie within a certain range. Minor fluctuations in the signal quality for a given location may be suppressed or cancelled, for example, ghost cancellation for interference caused by the multi-path reflection. A change in the known location 404A of the electronic apparatus 102 to the different location 404B may cause a change in the signal quality due to differences in at least a channel noise, an interference, a distortion, a bit synchronization problem, an attenuation, or a wireless multipath fading of broadcast RF signals from the different broadcast station 406. This may help to detect the change in the known location 404A of the electronic apparatus 102.

In accordance with an embodiment, the processor 204 may be configured to measure the signal quality of the broadcast RF signal based on an attenuation or an effective path loss of the broadcast RF signal from the different broadcast station 406. The processor 204 may be further configured to detect the change in the known location 404A of the electronic apparatus 102 based on a comparison of the measured signal quality with a previously measured signal quality for the known location 404A.

The multimedia content may include a plurality of signaling bits. In accordance with another embodiment, the processor 204 may be configured to extract the plurality of signaling bits from the multimedia content. The processor 204 may be further configured to detect the change in the known location 404A of the electronic apparatus 102 based on the extracted plurality of signaling bits. For example, the processor 204 may be configured to estimate a checksum value from the extracted plurality of signaling bits and estimate a transmission error for multimedia content based on the extracted plurality of signaling bits and the estimated checksum value. The transmission error may be associated with a pattern or a threshold range (in terms of BER) for each individual location of the electronic apparatus 102. Thus, when the electronic apparatus 102 gets relocated to the different location 404B, the transmission error may either follow a different pattern or may occur within a different threshold range as compared to that for the known location 404A. This will help the processor 204 to detect the change in the known location 404A of the electronic apparatus 102 from the known location 404A to the different location 404B.

In accordance with another embodiment, the processor 204 may be configured to determine the signal quality of the multimedia content based on the extracted plurality of signaling bits. In such a case, the signal quality may be represented in terms of an average or a peak BER within a given time frame. The processor 204 may be further configured to compare the determined signal quality with a threshold quality value and detect the change in the known location 404A of the electronic apparatus 102 based on the comparison of the determined signal quality with the threshold quality value. For example, the processor 204 may be configured to compute a BER from the extracted plurality of signaling bits and compare the computed BER with a threshold quality value for the BER, which may be stored in the memory 208. The processor 204 may be further configured to detect the change in the known location 404A of the electronic apparatus 102 from the known location 404A to the different location 404B, based on a result of the comparison of the computed BER and the threshold quality value.

In accordance with an embodiment, the multimedia content may further include emergency information, emergency identification information associated with the emergency information, and first identification information of the known broadcast station 402. The emergency identification information may be associated with the stored emergency alert setting. The emergency identification information may include emergency setting parameters (such as the type of emergency information, the degree of severity of the emergency information, or the mode to render the emergency information, as described in FIG. 3). The stored emergency alert setting of the electronic apparatus 102 may be set by the user 118 with respect to the known location 404A. The received emergency information at the known location 404A may be, for example, "Tornado warning in this area till 12:45 AM. Take shelter now. Check local media news".

In some other scenarios, the location of the electronic apparatus 102 may change from the known location 404A to the different location 404B. The memory 208 may be configured to store first identification information of the known broadcast station 402A. The first identification information may be stored in the memory 208 during a first-time setup of the electronic apparatus 102. At the different location 404B, the tuner 206 may be configured to receive the multimedia content from the different broadcast station 406. The processor 204 may be configured to extract second identification information of the different broadcast station 406 from the multimedia content. The processor 204 may be further configured to compare the stored first identification information of the known broadcast station 402A with the retrieved identification information of the different broadcast station 406B. The processor 204 may be further configured to detect the change in the known location 404A of the electronic apparatus 102 based on the comparison of the stored first identification information of the known broadcast station 402A with the retrieved identification information of the different broadcast station 406B.

The processor 204 may be further configured to control the display screen 210A to output the notification information on the display portion 408 to the user 118, based on the detection of the change in the known location 404A of the electronic apparatus 102. The notification information may be, for example, "Location change has been detected, please update your emergency settings". In some embodiments, the processor 204 may be further configured to control the speaker 210B to output the notification information to the user 118.

The processor 204 may be further configured to receive a first user input corresponding to at least one emergency setting parameter of the stored emergency alert setting based on the output notification information. The first user input may correspond to an update of the emergency alert setting with respect to the different location 404B in response to the notification information. As an example, for the known location 404A, the processor 204 may be configured to display a UI element 408A, a UI element 408B, and a UI element 408C on the display screen 210A. The UI element 408A may display location information, for example, City: "Houston", State: "Texas", Country:"USA", and Zip Code: "77010". Similarly, the UI element 408B may display the type of emergency information, for example, "Natural Disaster" as an input provided by the user 118. The UI element 408C may display the degree of severity, for example, "Moderate". Also, the display portion 410 at the known location 404AB may display emergency information corresponding to the known location 404AB, for example, "Tornado warning in this area till 12:45 AM. Take shelter now. Check local media news". After the location change is detected, then at the different location 404B, the UI element 408D and the UI element 408E may display the updated emergency alert settings (for example, "Earthquake" and "Property" as new user selections) and the degree of severity (for example, "High"), respectively. Also, the display portion 412 may display a notification, for example, "location change has been detected, please update your emergency settings". Also, the processor 204 may be configured to display new emergency information for updated emergency alert setting, for example "Earthquake warning in this area. Seek immediate shelter. Check local media and authorities".

In some embodiments, the processor 204 may be configured to transmit the notification information to the at least one external device of the plurality of external devices 110A, 110B . . . and 110N. The processor 204 may be further configured to receive, from the at least one external device of the plurality of external devices 110A, 110B . . . and 110N, the first user input corresponding to the at least one emergency setting parameter of the emergency alert setting. The processor 204 may be further configured to update the emergency alert setting of the electronic apparatus 102 based on the received first user input and store the updated emergency alert setting in the memory 208.

In some embodiments, the processor 204 may be configured to receive a second user input corresponding to the different location 404B. The processor 204 may be further configured to detect the change in the known location 404A of the electronic apparatus 102 based on the received second user input and update the stored location information based on the received second user input. The second user input may include one or more of an internet protocol (IP) address, a ZIP code, a postal code, a telephone number, or address information.

The tuner 206 may be configured to receive the multimedia content that includes the new emergency information from the different broadcast station 406 associated with the different location 404B, based on the updated emergency alert setting. The processor 204 may be configured to extract the emergency identification information of the new emergency information from the multimedia content. The processor 204 may be further configured to compare the emergency identification information of the new emergency information with the plurality of emergency setting parameters of the emergency alert setting. The processor 204 may be further configured to output the new emergency information based on the comparison of the emergency identification information of the new emergency information with the plurality of emergency setting parameters of the emergency alert setting. For example, the new emergency information received at the different location 404B may be "Earthquake warning in this area. Seek immediate shelter. Check local media and authorities".

In accordance with an embodiment, the electronic apparatus 102 may be communicatively coupled to at least one external device of the plurality of external devices 110A, 110B . . . and 110N. In such cases, the processor 204 may be configured to transfer the updated emergency alert setting of the electronic apparatus 102 to the at least one external device, via the second communication network 112. Alternatively, in an alternate embodiment, the processor 204 may be configured to control at least one of the speaker 210B or the display screen 210A to output the multimedia content, the new emergency information, the notification information, and/or an interface (I/F) for accessibility peripherals associated with the electronic apparatus 102.

Figure 5:
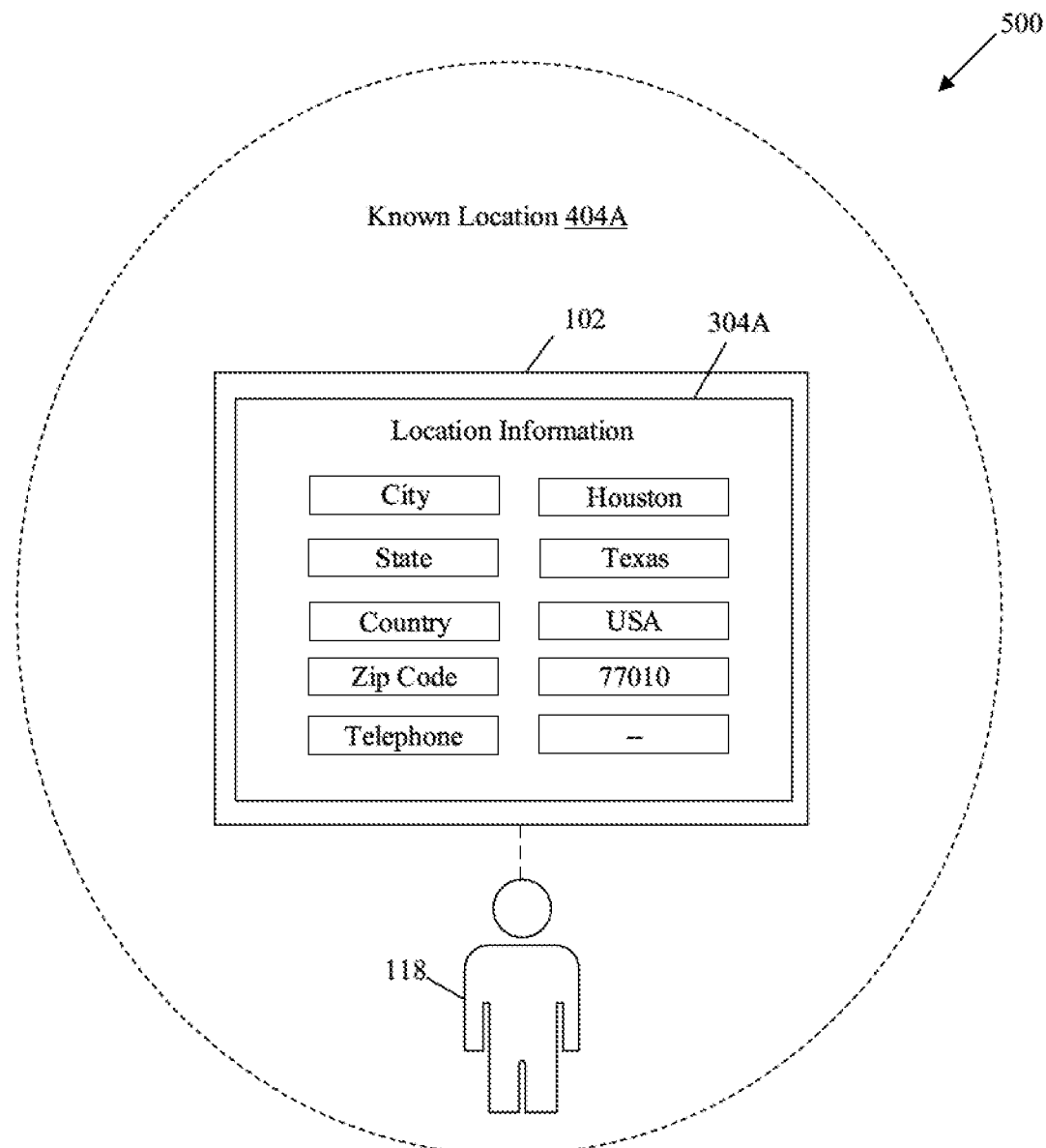
FIG. 5 illustrates an exemplary scenario for emergency alert setting control of the electronic apparatus of FIG. 2, in accordance with an embodiment of the disclosure.

FIG. 5 illustrates an exemplary scenario for emergency alert setting control of the electronic apparatus of FIG. 2, in accordance with an embodiment of the disclosure. FIG. 5 is explained in conjunction with elements from FIGS. 1, 2, 3, and 4. With reference to FIG. 5, there is shown an exemplary scenario 500. In the exemplary scenario 500, there is shown a UI element 304A for setting the location information of the electronic apparatus 102 at the known location 404A on the display screen 210A of the electronic apparatus 102. There is also shown the user 118 who is associated with the electronic apparatus 102.

In accordance with an embodiment, the processor 204 may be configured to store, in the memory 208, the location information of the electronic apparatus 102 that may be provided as an input by the user 118 during a first-time setup of the electronic apparatus 102. As an example, the location information may include, but is not limited to, city, state, country, Zone Improvement Plan (ZIP) code, postal code, and telephone number. The processor 204 may be configured to receive a second user input corresponding to the location information from the user 118 via the display screen 210A. The processor 204 may be configured to compare the received second user input corresponding to the location information with the stored location information. Further, the processor 204 may be configured to detect the change in the known location 404A of the electronic apparatus 102 based on the comparison of the stored location information and the received second user input. The processor 204 may be further configured to output the notification information to update the emergency alert setting of the electronic apparatus 102 to update the emergency alert setting.

The processor 204 may be further configured to receive the first user input to update the emergency alert setting of the electronic apparatus 102. The update of the emergency alert setting has been described in detail, for example, in FIG. 3. Further, the processor 204 may be configured to receive the new emergency information based on the updated emergency setting. Thus, the disclosed electronic apparatus 102 may facilitate the user 118 to update the emergency alert setting of the electronic apparatus 102 when the known location 404A of the electronic apparatus 102 changes. This may enhance accuracy in the reception of the relevant emergency information that may be based on the different location 404B of the electronic apparatus 102.

In accordance with another embodiment, the electronic apparatus 102 may include a Global Navigation Satellite System (GNSS) receiver which may determine location coordinates of the electronic apparatus 102 in real time or near real time. The processor 204 may be configured to automatically update the determined location coordinates of the electronic apparatus 102 as the location information in the memory 208 and further detect the change in the known location 404A from the known location 404A to the different location 404B, based on the updated location coordinates.

Figure 6:
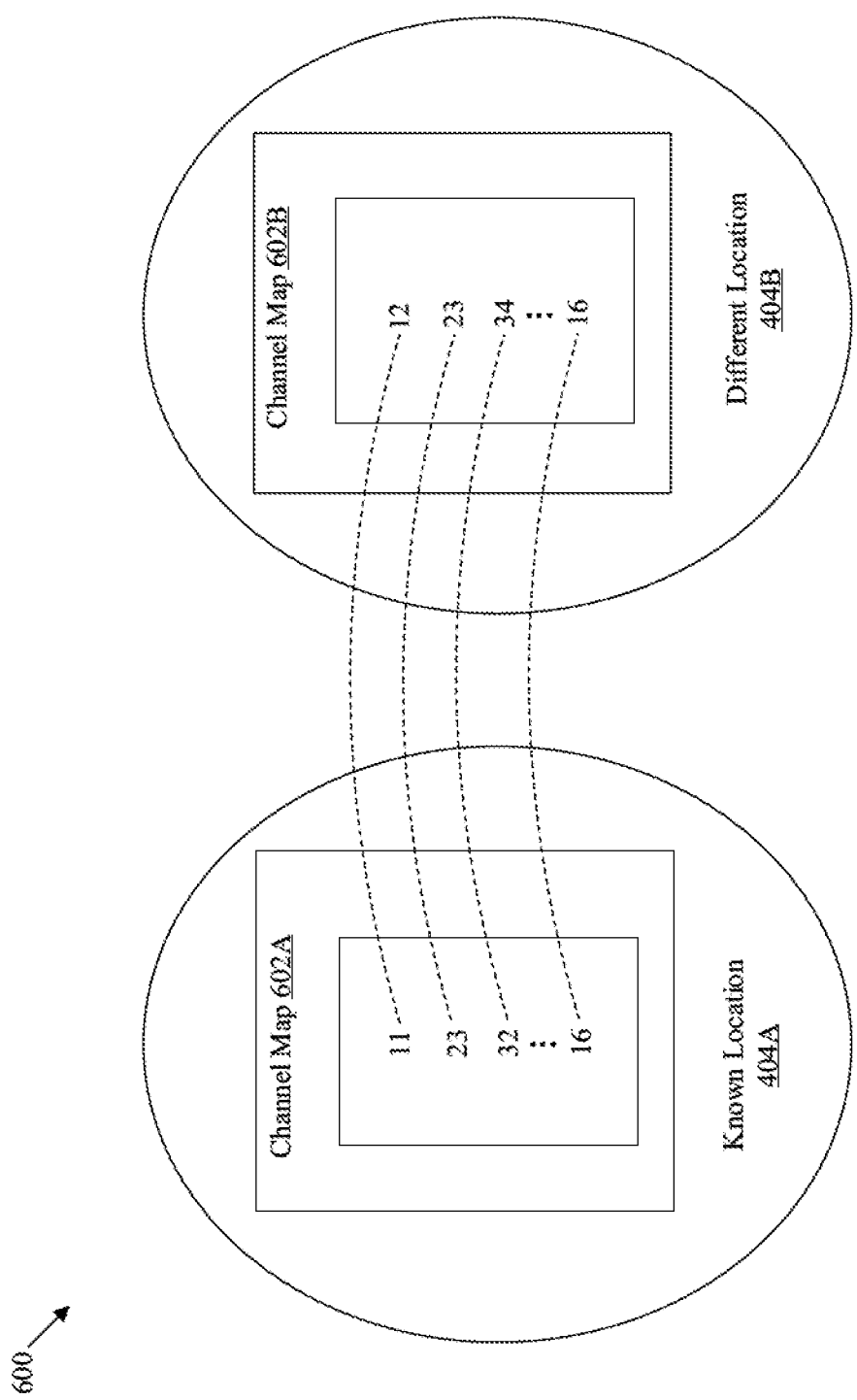
FIG. 6 illustrates an exemplary scenario for emergency alert setting control of the electronic apparatus of FIG. 2 using channel maps, in accordance with an embodiment of the disclosure.

FIG. 6 illustrates an exemplary scenario for emergency alert setting control of the electronic apparatus of FIG. 2 using channel maps, in accordance with an embodiment of the disclosure. FIG. 6 is explained in conjunction with elements from FIGS. 1, 2, 3, 4, and 5. With reference to FIG. 6, there is shown an exemplary scenario 600.

In the exemplary scenario 600, there is shown a channel map 602A of the electronic apparatus 102 with respect to the known location 404A and a channel map 602B of the electronic apparatus 102 with respect to the different location 404B. The channel map 602A may include a first list of a plurality of known broadcast channels (remapped to virtual channels or program numbers) received from the known broadcast station 402 associated with the known location 404A. Similarly, the channel map 602B may include a second list of a plurality of different broadcast channels (remapped to virtual channels or program numbers) received from the different broadcast station 406 associated with the different location 404B.

At the known location 404A, the processor 204 may be configured to store the channel map 602A in the memory 208 of the electronic apparatus 102. For example, the list of the plurality of known broadcast channels may be 11, 23, 32 . . . and 16. Each of the plurality of known broadcast channels may correspond to a channel frequency used by the known broadcast station 402 for broadcast of the multimedia content.

In certain scenarios, the channel map 602A may differ from the channel map 602B based on different factors. For example, one of the factors is that a channel frequency and a corresponding program number for the channel frequency may be different for the known broadcast station 402 and the different broadcast station 406. Another factor is that a virtual channel number for a given channel frequency in the channel map 602A may be different from the virtual channel number for the given channel frequency. As an example, the multimedia content on the broadcast channel "32" in the channel map 602A may be same as the broadcast channel "34" on the channel map 602B. This may be an indicator that the known location 404A of the electronic apparatus 102 has changed. The processor 204 may be configured to scan the plurality of different broadcast channels received from the different broadcast station 406 associated with different location 404B. This may be done to detect changes in the known location 404A of the electronic apparatus 102 to the different location 404B. The plurality of different broadcast channels may include the different broadcast channel.

The processor 204 may be further configured to generate the second list of the scanned plurality of different broadcast channels. For example, the second list of the scanned plurality of different broadcast channels may be 12, 23, 34 . . . and 16. The processor 204 may be further configured to compare the stored first list and the generated second list and detect the change in the known location 404A from the known location 404A to the different location 404B, based on a comparison between the stored first list and the generated second list.

The processor 204 may further generate the notification information based on the detection of the change in the known location 404A of the electronic apparatus 102. The processor 204 may be further configured to update the first list of the channel map 602A based on the generated second list. The processor 204 may be further configured to store the updated first list in the memory 208 and update the stored location information based on the different location 404B. In some embodiments, the processor 204 may be further configured to scan the plurality of different broadcast channels based on the output of the notification information.

In certain scenarios, some of the broadcast channels listed in the channel map 602A may be absent in the channel map 602B. Alternatively, the number of broadcast channels in the channel map 602B may be in excess as compared to the number of broadcast channels in the channel map 602A. In such cases, the processor 204 may be configured to detect the change in the known location 404A of the electronic apparatus 102 based on a difference in the number of broadcast channels in the first list of the plurality of known broadcast channels and the second list of the plurality of different broadcast channels.

In certain other scenarios, one or more communication parameters associated with a known broadcast channel of the known broadcast station 402 may change. This may be due to channel resource reassignment (e.g. frequency reallocation) performed by service providers of the known broadcast station 402. Alternatively, this may be due a different channel resource assignment (e.g. a different frequency allocation) for the same known broadcast channel by the different broadcast station 406 at the different location 404B.

In such cases, the processor 204 may be configured to store information of the one or more communication parameters (e.g. a transmission frequency) for the known broadcast channel. The processor 204 may be further configured to scan the plurality of known broadcast channels and detect a change in one or more communication parameters of the known broadcast channel. The processor 204 may be configured to detect a change in the known location 404A of the electronic apparatus 102 based on the detected change in the one or more communication parameters of the known broadcast channel. The processor 204 may be further configured to output the notification information to update the emergency alert setting based on the detection of the change in the known location 404A of the electronic apparatus 102.

The disclosed electronic apparatus 102 may provide the user 118 with the capability to update the emergency alert setting of the electronic apparatus 102 based on the scan of the plurality of known broadcast channels and the plurality of different broadcast channels when the known location 404A of the electronic apparatus 102 changes. This may enhance accuracy in the reception of the relevant emergency information that may be based on the current location of the electronic apparatus 102 and the user 118.

Figure 7:
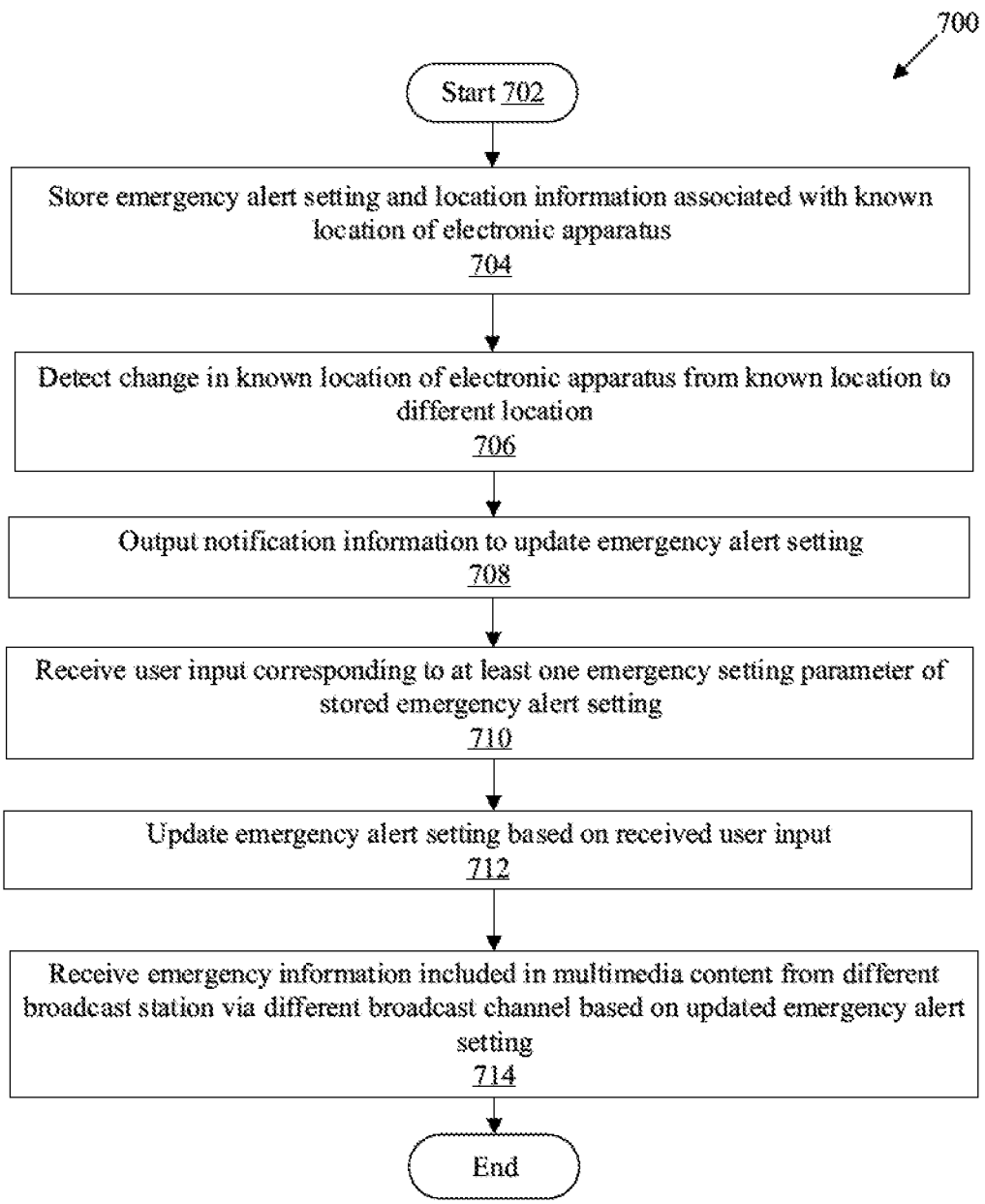
FIG. 7 depicts a flow chart that illustrates exemplary operations for emergency alert setting control of the electronic apparatus of FIG. 2, in accordance with an embodiment of the disclosure.

FIG. 7 depicts a flow chart that illustrates exemplary operations for emergency alert setting control of the electronic apparatus of FIG. 2, in accordance with an embodiment of the disclosure. The flowchart 700 may be described in conjunction with elements from FIGS. 1, 2, 3, 4, 5, and 6. With reference to FIG. 7, there is shown a flowchart 700. The operations from 702 to 714 may be implemented in the electronic apparatus 102. The operations in the flowchart 700 may start at 702 and proceed to 704.

At 704, emergency alert setting and location information associated with the known location 106 of the electronic apparatus 102 may be stored. The memory 208 may be configured to store the emergency alert setting and the location information associated with the known location 106 of the electronic apparatus 102. Examples of the location information and the emergency alert setting is described in detail, for example, in FIG. 3.

At 706, a change in the known location 106 of the electronic apparatus 102 from the known location 106 to the different location 116 may be detected. The processor 204 may be configured to detect the change in the known location 106 of the electronic apparatus 102 form the known location 106 to the different location 116. The detection of the change in the known location 106 of the electronic apparatus 102 is described in detail, for example, in FIGS. 4, 5, and 6.

At 708, notification information may be outputted to update the emergency alert setting. The processor 204 may be configured to output the notification information to update the emergency alert setting based on the detection of the change in the known location 106 of the electronic apparatus 102 from the known location 106 to the different location 116. The processor 204 may be further configured to output the notification information for the user 118 via at least one of the display screen 210A or the speaker 210B.

At 710, a first user input corresponding to at least one emergency setting parameter of the stored emergency alert setting may be received. The processor 204 may be configured to receive the first user input corresponding to the at least one emergency setting parameter of the store emergency alert setting of the electronic apparatus 102.

At 712, the emergency alert setting may be updated based on the received first user input. The processor 204 may be configured to update the emergency alert setting of the electronic apparatus 102 based on the received first user input. The processor 204 may be further configured to store the updated emergency alert setting in the memory 208.

At 714, new emergency information included in the multimedia content may be received from the different broadcast station 114 via the different broadcast channel. The processor 204 may be configured to receive the new emergency information from the different broadcast station 114 via the different broadcast channel based on the updated emergency alert setting. The different broadcast channel may be associated with the different broadcast station 114. Control passes to end.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for emergency alert setting control based on location change of an electronic apparatus. The electronic apparatus may include a memory. The at least one code section may cause the machine and/or computer to perform operations that include storage of emergency alert setting and location information associated with a known location of the electronic apparatus in the memory. The operations further include detection of a change in the known location of the electronic apparatus from the known location to a different location. The operations further include output of notification information to update the stored emergency alert setting based on the detected change in the known location of the electronic apparatus. Further, the operations further include reception of a first user input corresponding to at least one emergency setting parameter of the stored emergency alert setting based on the output notification information. The operations further include update of the emergency alert setting based on the received first user input. Further, the operations further include reception of new emergency information, included in multimedia content, from a different broadcast station via a different broadcast channel based on the updated emergency alert setting. The different broadcast station may be associated with the different broadcast channel.

Exemplary aspects of the disclosure may provide an electronic apparatus (such as the electronic apparatus 102). The electronic apparatus 102 may include the memory 208 configured to store an emergency alert setting of location information associated with the known location 106. The electronic apparatus 102 may further include the circuitry 202 configured to detect a change in the known location 106 of the electronic apparatus 102 from the known location 106 to the different location 116. The circuitry 202 may be further configured to output notification information to update the stored emergency alert setting based on the detected change in the known location 106 of the electronic apparatus 102. The circuitry 202 may be further configured to receive a first user input corresponding to at least one emergency setting parameter of the stored emergency alert setting based on the output notification information. The circuitry 202 may be further configured to update the emergency alert setting based on the received first user input. The circuitry may be further configured to receive new emergency information, included in multimedia content, from the different broadcast station 114 via a different broadcast channel, based on the updated emergency alert setting. The different broadcast station may be associated with the different location 116.

In accordance with an embodiment, the circuitry 202 may be configured to update the stored location information based on the different location 116. In accordance with an embodiment, the circuitry 202 may be further configured to scan a plurality of different broadcast channels of the different broadcast station 114 based on the output notification information.

In accordance with an embodiment, the circuitry 202 may be further configured to determine that the stored location information may be associated with the known location 106. The circuitry 202 may be configured to receive, from the known broadcast station 104, the multimedia content via a known broadcast channel based on the determination that the stored location information is associated with known location 106. The multimedia content may include emergency information different from the new emergency information.

In accordance with an embodiment, the circuitry 202 may be configured to detect a change in at least one communication parameter associated with the known broadcast channel. The circuitry 202 may be further configured to detect the change in the known location 106 of the electronic apparatus 102, based on the detected change in the at least one communication parameter associated with the known broadcast channel.

In accordance with an embodiment, the memory 208 may be further configured to store first identification information of the known broadcast station 104. The circuitry 202 may be further configured to receive the multimedia content from the different broadcast station. The circuitry 202 may be further configured to extract second identification information of the different broadcast station 114 from the received multimedia content. The circuitry 202 may be further configured to compare the stored first identification information with the extracted second identification information. The circuitry 202 may be further configured to detect the change in the known location 106 of the electronic apparatus 102 based on the comparison of the stored first identification information with the extracted second identification information.

In accordance with an embodiment, the multimedia content may include a plurality of signaling bits. The circuitry 202 may be further configured to extract the plurality of signaling bits from the multimedia content. The circuitry 202 may be further configured to detect the change in the known location 106 of the electronic apparatus 102 based on the extracted plurality of signaling bits.

In accordance with an embodiment, the circuitry 202 may be configured to determine signal quality of the multimedia content based on the extracted plurality of signaling bits. The circuitry 202 may be further configured to compare the determined signal quality with a threshold quality value. The circuitry 202 may be further configured to detect the change in the known location 106 of the electronic apparatus 102 based on the comparison of the determined signal quality with the threshold quality value.

In accordance with an embodiment, the circuitry 202 may be configured to receive a second user input corresponding to the different location 116. The circuitry 202 may be further configured to detect the change in the known location 106 of the electronic apparatus 102 based on the received second user input. The circuitry 202 may be further configure to update the stored location information based on the received second user input. The second user input may include one of an internet protocol (IP) address, a Zone Improvement Plan (ZIP) code, a telephone number, or address information.

In accordance with an embodiment, the electronic apparatus 102 may be communicatively coupled to at least one external device of the plurality of external devices 110A, 110B . . . and 110N. The circuitry 202 may be further configured to transfer the updated emergency alert setting of the electronic apparatus 102 to the at least one external device.

In accordance with an embodiment, the electronic apparatus 102 may be communicatively coupled to the at least one external device of the plurality of external devices 110A, 110B . . . and 110N. The circuitry 202 may be configured to transmit the notification information to the at least one external device. The circuitry 202 may be further configured to receive, from the at least one external device, the first user input corresponding to the at least one emergency setting parameter of the emergency alert setting. The circuitry 202 may be further configured to update the emergency alert setting based on the received first user input from the at least one external device.

In accordance with an embodiment, the electronic apparatus 102 may further include the speaker 210B and the display screen 210A. The circuitry 202 may be further configured to control at least one of the speaker 201B or the display screen 201A to output the multimedia content, the new emergency information, the notification information, and/or the interface (I/F) for accessibility peripherals associated with the electronic apparatus 102.

In accordance with an embodiment, the emergency alert setting may include a plurality of emergency setting parameters which may include the at least one emergency setting parameter. The plurality of emergency setting parameters may include at least one of a type of emergency information to be received, a degree of severity of the emergency information, or a mode to render the emergency information. The type of the emergency information may include at least one of a natural disaster type, a health type, or a property type.

In accordance with an embodiment, the multimedia content may include emergency identification information of the new emergency information. The emergency identification information may include at least one of a type of the new emergency information, or a degree of severity of the new emergency information. The circuitry 202 may be further configured to extract the emergency identification information of the new emergency information from the multimedia content. The circuitry 202 may be further configured to compare the emergency identification information of the new emergency information with the plurality of emergency setting parameters of the emergency alert setting. The circuitry 202 may be further configured to output the new emergency information based on the comparison of the emergency identification information of the new emergency information with the plurality of emergency setting parameters of the emergency alert setting.

In accordance with embodiment, the memory 208 may be configured to store a channel map (such as the channel map 602A) which may include a first list of a plurality of known broadcast channels received from the known broadcast station 104 associated with the known location 106. The circuitry 202 may be further configured to scan a plurality of different broadcast channels received from the different broadcast station 114 associated with the different location 116. The plurality of different broadcast channels may include the different broadcast channel. The circuitry 202 may be further configured to generate a second list of the scanned plurality of different broadcast channels. The circuitry 202 may be further configured to detect the change in the known location 106 of the electronic apparatus 102 based on comparison between the stored first list and the generated second list. The circuitry 202 may be further configured to update the first list of the channel map 602A based on the generated second list.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An electronic apparatus, comprising:
    a memory configured to store an emergency alert setting and location information associated with a location of the electronic apparatus; and circuitry configured to:
  determine that the stored location information is associated with a known location of the electronic apparatus;
  receive, from a known broadcast station, first multimedia content via a known broadcast channel based on the determination, wherein the first multimedia content comprises known emergency information;
  detect a change in the location of the electronic apparatus from the known location to a different location, wherein the different location is different from the known location;
  output notification information based on the detected change in the location of the electronic apparatus;
  receive a first user input corresponding to at least one emergency setting parameter of the stored emergency alert setting based on the output notification information;
  update the emergency alert setting based on the received first user input; and
  receive new emergency information, included in second multimedia content, from a different broadcast station via a different broadcast channel based on the updated emergency alert setting, wherein
    the different broadcast station is associated with the different location, and
    the new emergency information is different from the known emergency information.

2. The electronic apparatus according to claim 1, wherein the circuitry is further configured to update the stored location information based on the different location.

3. The electronic apparatus according to claim 1, wherein the circuitry is further configured to scan a plurality of different broadcast channels of the different broadcast station based on the output notification information.

4. The electronic apparatus according to claim 1, wherein the circuitry is further configured to:
  detect a change in at least one communication parameter associated with the known broadcast channel; and
  detect the change in the location of the electronic apparatus, based on the detected change in the at least one communication parameter associated with the known broadcast channel.

5. The electronic apparatus according to claim 1, wherein the memory is further configured to store first identification information of the known broadcast station, and the circuitry is further configured to:
  receive the second multimedia content from the different broadcast station;
  extract second identification information of the different broadcast station from the received second multimedia content;
  compare the stored first identification information with the extracted second identification information; and
  detect the change in the location of the electronic apparatus based on the comparison.

6. The electronic apparatus according to claim 1, wherein the second multimedia content comprises a plurality of signaling bits, and
the circuitry is further configured to:
  extract the plurality of signaling bits from the second multimedia content; and
  detect the change in the location of the electronic apparatus based on the extracted plurality of signaling bits.

7. The electronic apparatus according to claim 6, wherein the circuitry is further configured to:
  determine signal quality of the second multimedia content based on the extracted plurality of signaling bits;
  compare the determined signal quality with a threshold quality value; and
  detect the change in the location of the electronic apparatus based on the comparison.

8. The electronic apparatus according to claim 1, wherein the circuitry is further configured to:
  receive a second user input corresponding to the different location;
  detect the change in the location of the electronic apparatus based on the received second user input; and
  update the stored location information based on the received second user input.

9. The electronic apparatus according to claim 8, wherein the second user input comprises at least one of an internet protocol (IP) address, a ZIP code, a postal code, a telephone number, or address information.

10. The electronic apparatus according to claim 1, wherein
  the electronic apparatus is communicatively coupled to at least one external device, and
  the circuitry is further configured to transfer the updated emergency alert setting of the electronic apparatus to the at least one external device.

11. The electronic apparatus according to claim 1, wherein
  the electronic apparatus is communicatively coupled to at least one external device, and
  the circuitry is further configured to:
    transmit the notification information to the at least one external device;
    receive, from the at least one external device, the first user input corresponding to the at least one emergency setting parameter of the emergency alert setting; and
    update the emergency alert setting based on the received first user input from the at least one external device.

12. The electronic apparatus according to claim 1, further comprising:
  a speaker; and
  a display screen,
    wherein the circuitry is further configured to control at least one of the speaker or the display screen to output the first multimedia content, the second multimedia content, the new emergency information, the notification information, or an interface (I/F) for accessibility peripherals associated with the electronic apparatus.

13. The electronic apparatus according to claim 1, wherein
  the emergency alert setting comprises a plurality of emergency setting parameters which includes the at least one emergency setting parameter,
  the plurality of emergency setting parameters comprises at least one of a type of emergency information to be received, a degree of severity of the emergency information, or a mode to render the emergency information, and
  the type of the emergency information comprises at least one of a natural disaster type, a health type, or a property type.

14. The electronic apparatus according to claim 13, wherein
- the second multimedia content comprises emergency identification information of the new emergency information,
- the emergency identification information comprises at least one of a type of the new emergency information or a degree of severity of the new emergency information, and
- the circuitry is further configured to:
  - extract the emergency identification information of the new emergency information from the second multimedia content;
  - compare the emergency identification information of the new emergency information with the plurality of emergency setting parameters of the emergency alert setting; and
  - output the new emergency information based on the comparison.

15. The electronic apparatus according to claim 1, wherein
- the memory is further configured to store a channel map which includes a first list of a plurality of known broadcast channels received from the known broadcast station associated with the known location, and
- the circuitry is further configured to:
  - scan a plurality of different broadcast channels received from the different broadcast station associated with the different location, wherein the plurality of different broadcast channels includes the different broadcast channel;
  - generate a second list of the scanned plurality of different broadcast channels;
  - detect the change in the location of the electronic apparatus based on comparison between the stored first list and the generated second list; and
  - update the first list of the channel map based on the generated second list.

16. A method, comprising:
- in an electronic apparatus that comprises a memory:
  - storing, in the memory, an emergency alert setting and location information associated with a location of the electronic apparatus;
  - determining that the stored location information is associated with a known location of the electronic apparatus;
  - receiving, from a known broadcast station, first multimedia content via a known broadcast channel based on the determination, wherein the first multimedia content comprises known emergency information;
  - detecting a change in the location of the electronic apparatus from the known location to a different location, wherein the different location is different from the known location;
  - outputting notification information based on the detected change in the location of the electronic apparatus;
  - receiving a first user input corresponding to at least one emergency setting parameter of the stored emergency alert setting based on the output notification information;
  - updating the emergency alert setting based on the first user input; and
  - receiving new emergency information, included in second multimedia content, from a different broadcast station via a different broadcast channel based on the updated emergency alert setting, wherein
  - the different broadcast station is associated with the different location, and
  - the new emergency information is different from the known emergency information.

17. The method according to claim 16, further comprising updating the stored location information based on the different location.

18. The method according to claim 16, further comprising:
- receiving a second user input corresponding to the different location;
- detecting the change in the location of the electronic apparatus based on the received second user input; and
- updating the stored location information based on the received second user input.

19. The method according to claim 18, wherein the second user input comprises at least one of an internet protocol (IP) address, a ZIP code, a postal code, a telephone number, or address information.

20. An electronic apparatus, comprising:
- a memory configured to store an emergency alert setting and location information associated with a location of the electronic apparatus; and
- circuitry configured to:
  - determine that the stored location information is associated with a known location of the electronic apparatus;
  - receive, from a known broadcast station, first multimedia content via a known broadcast channel based on the determination, wherein the first multimedia content comprises known emergency information;
  - detect a change in at least one communication parameter associated with the known broadcast channel;
  - detect the change in the location of the electronic apparatus from the known location to a different location based on the detected change in the at least one communication parameter associated with the known broadcast channel;
  - output notification information based on the detected change in the location of the electronic apparatus;
  - receive a first user input corresponding to at least one emergency setting parameter of the stored emergency alert setting based on the output notification information;
  - update the emergency alert setting based on the received first user input; and
  - receive new emergency information, included in second multimedia content, from a different broadcast station via a different broadcast channel based on the updated emergency alert setting, wherein
  - the different broadcast station is associated with the different location, and
  - the new emergency information is different from the known emergency information.

* * * * *